(12) United States Patent
Starosielsky et al.

(10) Patent No.: US 10,348,699 B2
(45) Date of Patent: Jul. 9, 2019

(54) IDENTITY BINDING SYSTEMS AND METHODS IN A PERSONAL DATA STORE IN AN ONLINE TRUST SYSTEM

(71) Applicant: Evident ID, Inc., Alpharetta, GA (US)

(72) Inventors: Damian A. Starosielsky, Suwanee, GA (US); William David Thomas, Roswell, GA (US); Albert W. Brzeczko, Jr., Roswell, GA (US); Nathan S. Rowe, Marietta, GA (US)

(73) Assignee: Evident ID, Inc., Alpharetta, GA (US)

( * ) Notice: Subject to any disclaimer, the term of this patent is extended or adjusted under 35 U.S.C. 154(b) by 280 days.

(21) Appl. No.: 15/383,868

(22) Filed: Dec. 19, 2016

(65) Prior Publication Data

US 2017/0237717 A1     Aug. 17, 2017

Related U.S. Application Data

(63) Continuation-in-part of application No. 15/041,876, filed on Feb. 11, 2016.

(51) Int. Cl.
*H04L 29/06* (2006.01)
*H04L 9/08* (2006.01)
(Continued)

(52) U.S. Cl.
CPC .......... *H04L 63/0435* (2013.01); *G06F 21/44* (2013.01); *G06F 21/57* (2013.01);
(Continued)

(58) Field of Classification Search
CPC ........ G06F 21/44; G06F 21/57; G06F 21/602; H04L 9/0822; H04L 9/3247
See application file for complete search history.

(56) References Cited

U.S. PATENT DOCUMENTS

| | | |
|---|---|---|
| 7,392,388 B2 | 6/2008 | Keech |
| 8,364,605 B2 | 1/2013 | Rosenthal et al. |

(Continued)

OTHER PUBLICATIONS

Jumio's ID verification technology, Netverify https://www.jumio.com/netverify/.

(Continued)

*Primary Examiner* — Jeffrey C Pwu
*Assistant Examiner* — Thong P Truong
(74) *Attorney, Agent, or Firm* — Clements Bernard Walker PLLC; Lawrence A. Baratta, Jr.

(57) ABSTRACT

A computer-implemented method for managing a personal data store is described for binding one or more identities of different types associated with a user. The computer-implemented method is implemented in a trust system including one or more processing devices communicatively coupled to a network. The computer-implemented method includes receiving one or more self-asserted first attributes by the user and second attributes asserted by an Attribute Provider; utilizing one or more of the first attributes and the second attributes as inputs to obtain and/or produce one or more cryptographically signed attributes signed by an associated Attribute Provider; storing the first attributes, the second attributes, and the one or more cryptographically signed attributes in a personal data store associated with the user; and utilizing one or more of the first attributes, the second attributes, and the one or more cryptographically signed attributes to respond to a request from a Relying Party.

17 Claims, 6 Drawing Sheets

(51) Int. Cl.
  *G06F 21/60* (2013.01)
  *H04L 9/32* (2006.01)
  *G06F 21/44* (2013.01)
  *G06F 21/57* (2013.01)

(52) U.S. Cl.
  CPC .......... *G06F 21/602* (2013.01); *H04L 9/0822* (2013.01); *H04L 9/3247* (2013.01); *H04L 2463/062* (2013.01)

(56) References Cited

U.S. PATENT DOCUMENTS

| | | |
|---|---|---|
| 8,489,071 B2 | 7/2013 | Mechaley, Jr. |
| 8,549,657 B2 | 10/2013 | Karlson et al. |
| 8,774,781 B1 | 7/2014 | Speiser et al. |
| 8,776,180 B2 | 7/2014 | Kumar et al. |
| 8,850,535 B2 | 9/2014 | Liberman et al. |
| 2006/0212931 A1 | 9/2006 | Shull et al. |
| 2006/0259320 A1 | 11/2006 | LaSalle et al. |
| 2007/0124226 A1 | 5/2007 | Garner, Jr. |
| 2009/0228714 A1 | 9/2009 | Fiske et al. |
| 2010/0306076 A1 | 12/2010 | Taveau et al. |
| 2011/0113098 A1 | 5/2011 | Walsh et al. |
| 2011/0145920 A1 | 6/2011 | Mahaffey et al. |
| 2012/0200390 A1 | 8/2012 | Saravanan |
| 2012/0233665 A1 | 9/2012 | Ranganathan et al. |
| 2013/0109349 A1 | 5/2013 | Iyengar |
| 2013/0152182 A1 | 6/2013 | Pala |
| 2013/0205380 A1 | 8/2013 | Avni et al. |
| 2013/0227700 A1 | 8/2013 | Dhillon et al. |
| 2013/0303159 A1 | 11/2013 | Gathala et al. |
| 2014/0090021 A1 | 3/2014 | Berkovnzetal |
| 2015/0332029 A1* | 11/2015 | Coxe .................. H04L 63/0815 726/9 |

OTHER PUBLICATIONS

Airbnb, "What is Verified ID?" https://www.airbnb.com/support/article/450.

Zoosk, "Zoosk Addresses Top Online Dating Concern with Launch of Photo Verification for Android Devices," Sep. 30, 2014, https://about.zoosk.com/ko/press-releaseskoosk-addresses-top-online-dating-concern-with-launch-of-photo-verification-for-android-devices/.

Ross Charles Langley, "Think online dating should be less creepy? There's an app for that," Mar. 24, 2015 http://www.builtinla.com/2015/03/19/think-online-dating-should-be-less-creepy-there-s-app.

"Love Lab Launches New App to Solve Biggest Problem with Online Dating: Creating Chemistry," Feb. 11, 2015 http://www.reuters.com/article/2015/02/11/ca-love-lab-idUSnBw115239a+100+BSW20150211.

* cited by examiner

IDENTITY BINDING SYSTEMS AND METHODS IN A PERSONAL DATA STORE IN AN ONLINE TRUST SYSTEM

CROSS-REFERENCE TO RELATED APPLICATION(S)

The present patent/application is a continuation-in-part of U.S. patent application Ser. No. 15/041,876 filed on Feb. 11, 2016, and entitled "SYSTEMS AND METHODS FOR ESTABLISHING TRUST ONLINE," the contents of which are incorporated by reference.

FIELD OF THE DISCLOSURE

The present disclosure generally relates to computer and networking systems and methods. More particularly, the present disclosure relates to systems and methods for establishing trust online, namely for identity binding systems and methods in a personal data store in an online trust system.

BACKGROUND OF THE DISCLOSURE

Twenty years ago the Internet was primarily used to consume information and speed up communication. The Internet has changed dramatically and now enables sensitive and personalized interactions with traditional business such as financial institutions, retailers, healthcare providers, and government in addition to a new breed of sharing economy service providers that offer services like ridesharing, temporary work, accommodations and dating. The sharing economy, which enables peer to peer based sharing or access to goods and services, is a particularly sensitive category where an interaction can touch our physical lives (e.g., ridesharing services drive people around, online classifieds connect people to local goods and services, accommodation services let people rent individual rooms within homes or entire houses, dating sites help people find long and short term relationships, etc.). Today, however, little is known or verified about the parties involved in these interactions. The lack of a simple way to establish trust in a peer-to-peer fashion will limit the potential of this new breed of Internet services.

Conventionally, interactions to date have been simplified with little risk, e.g., need a ride, sell a used phone, connect virtually to someone, etc. However, even these simplified interactions have been problematic—reported assaults on ride-sharing services, scams on e-commerce sites, terrorists and other mischievous individuals using social networks, etc. The sensitivity of these interactions is only increasing— consider ridesharing to pick up a child from school, selling an item where the buyer will enter your home, leveraging on-demand temporary staff, or searching for a brief personal encounter. Each of these applications offers a far richer experience but comes with far greater risk to personal safety and well-being. The scale, speed, complexity, and global nature of the Internet and these applications brings an entirely new level of risk, and, unfortunately, new avenues for bad actors to exploit it.

Establishing trust online poses several challenges that do not affect our traditional, offline methods of determining trust. Online, people do not truly know who they are dealing with; and, therefore, cannot determine if they are deserving of trust. This fundamentally limits our willingness to engage in interactions on the Internet. Without a reliable basis for establishing trust, people either trust or distrust for arbitrary reasons, e.g. new service is popular, generational differences lead to risk avoidance, or a user has many social media followers. Online, users often are required to submit personal information as they register for new services. However, they are increasingly concerned about providing such information due to the frequency of data breaches and hacks. These are some of the types of challenges associated with establishing trust online. Without a reliable basis for establishing trust online, there is a ceiling on the type of interactions we are willing to use the Internet to facilitate.

Conventionally, trust is addressed differently by different providers.

Social networks have policies on inappropriate content and work tirelessly to expel users while avoiding thorny freedom of speech issues;

Sharing economy providers and commerce sites use peer reviews to ensure that bad actors have limited opportunity. Under pressure, some have added more extensive background checks. But they constantly balance adoption with safety and security;

Sharing economy providers who specialize in offering temporary work often do some level of validation of the workers who deliver the services. Lack of transparency and standards or regulation prevent consistency;

Social activity sites leave it to users to protect themselves and rarely (if ever) offer peer reviews;

Financial institutions often rely on knowledge-based questions to establish identity which is limited in its ability to establish true identity;

Users often simply take a leap of faith putting their personal safety at risk utilizing the services offered.

Online trust must evolve. A more reliable and transparent trust model is needed to support the scale, speed, complexity, and global nature of the current and future interactions facilitated by the Internet.

As part of building a trust model online, it is imperative to verify, bind, and store aspects of an individual's identity online, e.g., in a personal data store. As the information stored is extremely valuable and sensitive to the individual as well as its veracity important to relying parties, techniques are required to vet the information and securely store it.

BRIEF SUMMARY OF THE DISCLOSURE

In an exemplary embodiment, a computer-implemented method for managing a personal data store is described for binding one or more identities of different types associated with a user. The computer-implemented method is implemented in a trust system including one or more processing devices communicatively coupled to a network. The computer-implemented method includes receiving one or more self-asserted first attributes by the user and second attributes asserted by an Attribute Provider; utilizing one or more of the first attributes and the second attributes as inputs to obtain and/or produce one or more cryptographically signed attributes signed by an associated Attribute Provider; storing the first attributes, the second attributes, and the one or more cryptographically signed attributes in a personal data store associated with the user; and utilizing one or more of the first attributes, the second attributes, and the one or more cryptographically signed attributes to respond to a request from a Relying Party.

BRIEF DESCRIPTION OF THE DRAWINGS

The present disclosure is illustrated and described herein with reference to the various drawings, in which like refer

FIG. 6 is a block diagram of a user device 14, which may be used in the trust framework system or the like.

DETAILED DESCRIPTION OF THE DISCLOSURE

Figure 1:
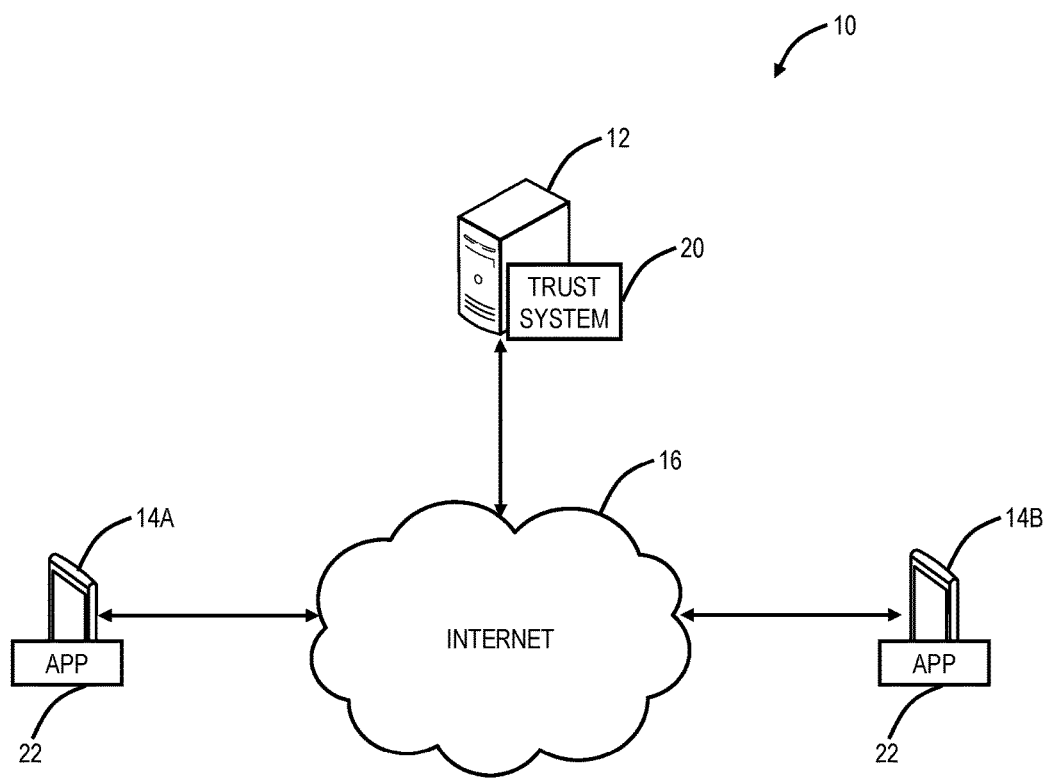
- FIG. 1 is a network diagram of a trust framework system.

In various exemplary embodiments, a more reliable and transparent trust model is described to support the scale, speed, complexity, and global nature of interactions facilitated by the Internet. The trust model consists of one or more of the following a) verification of a user's physical identity; b) facts, attributes, and other pertinent information that have been attested to by a relevant party; c) ability to instantly share facts, attributes, other pertinent information, or derivatives; d) ability to limit disclosure of facts, attributes, and other pertinent information to a derivative that reveals the least information required; e) makes the user the exclusive owner of their information with complete control over when and if facts, attributes, and other pertinent information is shared; and f) communicates the level of assurance or security that can be afforded to various elements of the system. All of the above in a convenient and efficient framework.

The trust systems and methods described herein allow for a proofed identity to be paired with facts, attributes, and other pertinent information; allowing a user to create their own authentic ID to be presented as credentials in an interaction; and the like. Variously, the trust systems and methods allow the limited disclosure of facts, attributes, and other pertinent information about a user to a recipient for the purpose of enabling an electronic (online, virtual, etc.) or a physical interaction between the individuals or between an individual and a business. Advantageously, the trust systems and methods provide the user complete control over the disclosure of facts, attributes, and other pertinent information. Further, the disclosed information is limited to the least information required for the interaction. In cases where the actual attribute is not to be shared, facts will be derived from the source attribute to enable the minimum amount of information necessary for enabling the interaction. User information may reside in an app, in the cloud, or in another convenient storage location, but in all cases, the user information is encrypted and only accessible by the user themselves. Caching of attested information from Attribute Providers as an attribute store in the cloud provides agility (e.g. eliminates a single point of failure, survivability across end user devices, enables speed of transactions, monitoring, fraud detection, ongoing attribute gathering). The trust systems and methods allow different levels of assurance to be associated with the attributes being requested by the recipient. Further, users can authenticate into the trust systems and methods using existing unique identification (IDs), such as Facebook, Google, phone number, credit/bank card/account, etc., as well as a direct login via a trust system ID. Information recipients can also authenticate and transact using an Application Programming Interface (API) for programmatic interaction with the trust system and methods.

§ 1.0 Trust Framework System

Referring to FIG. 1, in an exemplary embodiment, a network diagram illustrates a trust framework system 10. The trust framework system 10 includes one or more servers 12 communicatively coupled to a plurality of user devices 14 (shown in FIG. 1 as user devices 14A, 14B) through the Internet 16. The one or more servers 12 could also be cloud computing resources or the like. The one or more servers 12 operate a trust system 20 which is configured to provide a trust framework in combination with apps 22 that operate on the user devices 14. FIG. 1 is shown with two user devices 14A, 14B for illustration purposes, and a practical embodiment could include any number of user devices 14. The user devices 14, and the app 22 operating thereon are associated with a user. In general, the trust framework system 10 is configured to allow one of the users, through the user device 14A and the app 22, to ask another user, through the user device 14B and the app 22, a question related to trust. The trust system 20 is configured to work cooperatively with the app 22 to answer the question. The trust system 20 includes one or more processing devices (e.g., servers, virtual machines, software containers, etc.) communicatively coupled to a network (e.g., the Internet).

Importantly, the trust system 20 provides a response based on collected facts, attributes or other pertinent information to the questions thereby enabling the receiving user to establish trust with the sending user while minimizing the transmission of personally identifiable information (PII) to the receiving user. Furthermore, the trust system 20 does not necessarily have to provide PII between the users when answering the questions. Rather, the trust system 20 can provide an indicator for the answer such as red (negative), yellow, or green (affirmative), or yes/no answers to questions based on facts. Additionally, the trust system 20 is open and can be integrated into various online systems. That is, the trust system 20 is independent of authentication, i.e., the trust system 20 is not a Google ID, Apple ID, Facebook login, etc. Rather, the trust system 20 can be used with various different authentication systems.

The trust system 20 is an online service, operated on the one or more servers 12 or the like. It is communicatively coupled to the user devices 14 via the Internet 16, such as through wireless service providers, Local Area Networks (LANs), Wireless LANs (WLANs), and combinations thereof. The trust system 20 is configured to perform the various processes described herein in conjunction with the apps 22. In an exemplary embodiment, the trust system 20 is configured to perform these processes without encryption keys required to access user information (PII or otherwise). Rather, the encryption keys to unlock the user's PII are always in control of the user on the user's device 14.

The apps 22 are locally operated by the user devices 14. In an exemplary embodiment, the apps 22 are provided to the user devices 14 through application services such as the App Store (Apple), Google Play (Google), or Windows Marketplace (Microsoft). In another exemplary embodiment, the apps 22 are executed locally on the user devices 14 via a Web browser. Other embodiments are also contemplated. The apps 22 enable the users to interact with the trust system 20 for performing various queries as described herein.

§ 1.1 Trust Framework System Functionality

Figure 2:
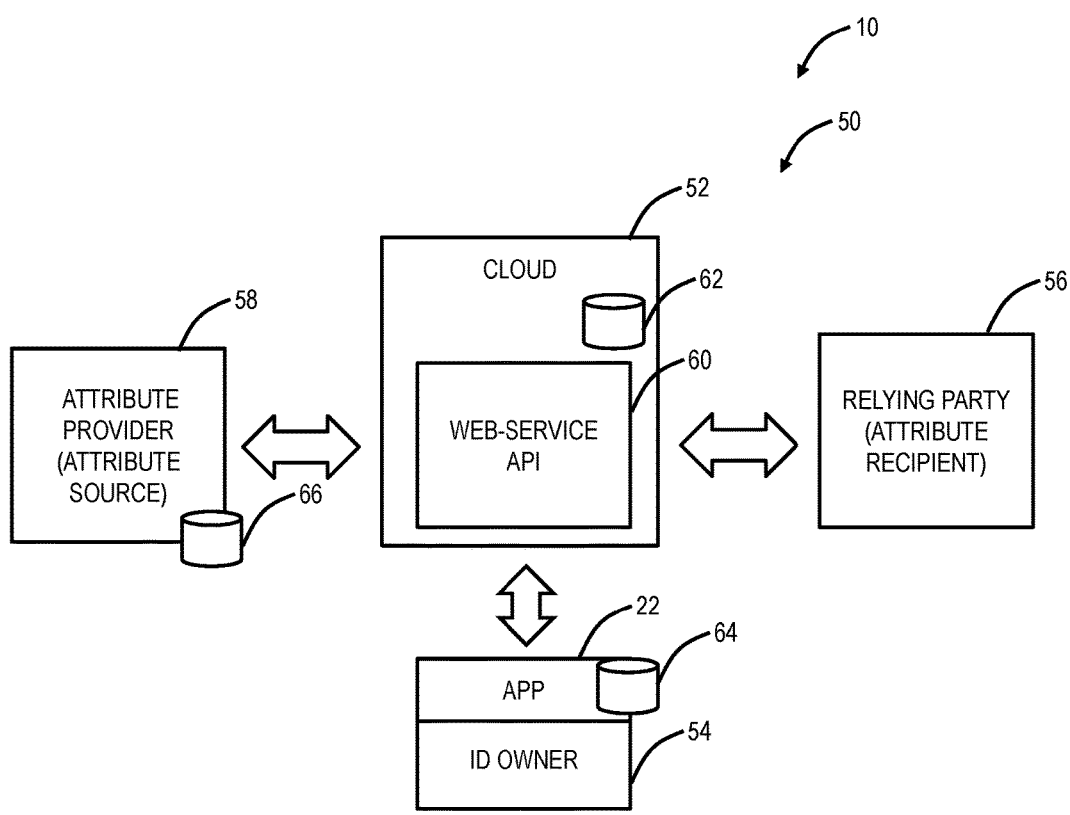
FIG. 2 is a block diagram of functional components of the trust framework system of FIG. 1.

Referring to FIG. 2, in an exemplary embodiment, a block diagram illustrates functional components 50 of the trust framework system 10. The functional components 50 include cloud resources 52, an ID Owner 54 (such as one of the users 14), a Relying Party 56 (such as another one of the users 14), and Attribute Providers 58. These functional components 50 can correspond to the physical devices illustrated in FIG. 1 in the trust framework system 10. For example, the ID Owner 54 and the Relying Party 56 can also be the user devices 14. The cloud resources 52 can be through the trust system 20, and the like. The cloud resources 52 can include a web service API 60 and local data storage 62. The ID Owner 54 can include the user device 14 executing the app 22 along with local data storage 64. The Attribute Providers 58 can be external information sources, verification sources, etc. and can include data storage 66.

Again the functional components 50 of the trust framework system 10 allow the limited disclosure of attested facts, attributes, or other pertinent information about the ID Owner 54 to the Relying Party 56 for the purpose of enabling electronic (online, virtual, etc.) or physical interactions between two individuals or between an individual and a business. The ID Owner 54 can control the information, and disclosure is only with his/her explicit approval. Also, the functional components 50 provide only the minimum amount of information necessary for enabling the interaction. User information may reside in the app 22, in the local data storage 62, or in the data storage 66. Also, caching of information from the Attribute Providers 58 can be done in the cloud resources 52 for agility in information exchanges. The purpose of the functional components 50 is to allow different levels of assurance/verification for the information being requested by the Relying Party 56. The end user 54 can authenticate through the app 22 to the web service API 60 using an existing ID (Facebook, Google, Apple, etc.) or an ID associated with the trust system 20.

In an exemplary embodiment, a computer-implemented method implemented in a trust system includes receiving a request from a first user, wherein the request is to a second user and relates to the second user sharing verified facts, attributes, and other pertinent information used by the first user in determining the level of trust to be afforded to the second user; providing the request to the second user for consent and for data acquisition related to the request; performing data acquisition responsive to the consent to obtain data; determining a response for the request based on the data; and providing the response to the first user, wherein the response is a minimum subset or derivative of the data required to answer the request so that the data is only shared with the first user on a limited basis.

In another exemplary embodiment, a trust system includes a network interface communicatively coupled to a first user and a second user; a processor communicatively coupled to the network interface; and memory storing instructions that, when executed, cause the processor to receive a request from a first user, wherein the request is to a second user and relates to the second user sharing verified facts and other pertinent information used in determining the level of trust to be afforded to the second user; providing the request to the second user for consent and for data acquisition related to the request; perform data acquisition responsive to the consent to obtain data; determine a response to the request based on the data; and provide the response to the first user, wherein the response is a minimum subset or derivative of the data required to answer the request so that the data is only shared with the first user on a limited basis.

In a further exemplary embodiment, a user device includes a network interface communicatively coupled to a trust system; a processor communicatively coupled to the network interface; and memory storing instructions that, when executed, cause the processor to provide a request to the trust system, wherein the request is to a second user and relates to the second user sharing verified facts and other pertinent information used in determining the level of trust to be afforded to the second user; and subsequent to approval of the request by the second user for consent and for data acquisition related to the request, subsequent to data acquisition responsive to the consent to obtain data by the trust system, and subsequent to a response determination by the trust system based on the data, receive the response, wherein the response is a minimum subset or derivative of the data required to answer the request so that the data is only shared with the first user on a limited basis.

§ 1.2 User Information/ID Owner Information

An identification (ID) includes identity (who you are) and attributes (what you are). The identity can have a limitless list of information attached to it. In the trust framework system 10, user information can be logically partitioned into two areas, namely identity information (who you are) and attribute information (what you are). Both types of information can be scored according to levels of assurances and used in the various queries described herein. Identity information unambiguously and uniquely identifies an individual. Assurance of identity translates to the level of confidence that the person is who he/she claims to be. Attribute information can be represented as a structured data model where attributes can be grouped together in a logical hierarchy. Attributes could be behavioral in nature. Assurance of attributes translates to the level of confidence in the authenticity and accuracy of the attribute including factors such as confidence in the Attribute Provider and the timeliness of the attribute.

The user owns the identity information and attribute information and must approve any release of the facts, attributes, or other pertinent information or derivatives of facts, attributes, or other pertinent information based. Requests could be both proactive (pre-approved) and reactive. Pre-approval will require the owner of the information to approve explicitly release of information through application or web page. Once approved the requestor would receive a response with limited to only the specific information the information owner approved. In addition to approving the request, the user may have the option of ignoring the request which the requestor would not receive any response or explicitly denying the request which would result in a confirmation to the requestor that the user had denied the request. The user may also set pre-approvals for the release of information based on specific requestor or for specific types of information, in all cases requests are logged, and the user has visibility to what information was released and to which relying parties the information was released.

§ 1.3 Attribute Provider

In some cases, the trust framework system 10, namely the cloud resources 52 and/or the trust system 20 may need to query external information sources/verification systems in the attribute sources 58. Examples of these systems can include, without limitation, credit bureaus, financial institutions, a government such as the Internal Revenue Service, Department of Motor Vehicles (DMVs), background check companies, and the like. These queries can be to gather, verify, or refresh data about a user. The rationale to cache data from the external sources 58 is to allow agility in information exchanges. When the user gives consent to trust framework system 10 to get data on its behalf, data goes directly from the source to the trust framework system 10, which eliminates the possibility of manipulation. In some cases, the trust framework can attest to an attribute and would be able to sign it digitally to track source and authenticity. Additionally, attributes retrieved from attribute providers will be digitally signed to ensure authenticity can be proven at a later point in time. Also, attributes can have an assurance level score assigned to them. The attribute provider will directly or indirectly assist in establishing the level of assurance assigned to each attribute.

§ 1.4 Relying Party

The verified information recipient 56 is the party that is interested in obtaining verified identity and/or attribute information about an individual before engaging in business/personal activities with him or her. Examples can include, without limitation, a bank verifies employment and credit information before giving a loan; an adult e-commerce site verifies age before authorizing a product sale; an online dating user verifies other party's criminal background, age, and employment prior to meeting him or her face to face; a staffing company verifies an individual's identity, criminal history, and qualifications before hiring him or her; and the like.

The trust framework system 10 can also run a behavior analysis algorithm to detect fraud. Machine learning and anomalous behavior detection may be used against user activity, relying party request activity or attribute provider information to detect and isolate potentially fraudulent actions. Fraud detection engines also leverage initial and ongoing proofing techniques. Fraud detection may generate an alert or halt sharing activities for that user. These fraud detection techniques provide the trust system assurances that the user is who they say they are, and the device or keys have not been lost or stolen.

§ 1.5 Cloud

The cloud resources 62 store encrypted information about users and makes it available via APIs 60 for recipients when the ID Owner authorizes the disclosure. Importantly, attribute data at rest which requires explicit ID Owner approval for dissemination (in the components 62 & 64) is encrypted with ID Owner user-controlled keys. Data in transit (between 60 and 56 or 22) is encrypted with session keys only accessible to the Relying Party and the ID Owner. Note, the data at rest can be in the data storages 62, 64. In some cases, limited storage techniques are employed such as, for example, storing a one-way hash that only allows the verification of information but not the retrieval of it. Advantageously, the data is opaque to the trust framework system 10.

§ 1.6 App

The app 22 allows all interaction by users with the trust framework system 10. The app 22 allows the user to control what information can be shared when, and with whom. For example, the app 22 can display a relying party's identity and identity assurance level or specific attribute requested to allow the user to make a decision to allow the dissemination of information. The app 22 can allow the alerting of possible malicious activity, to which the user may respond by halting portions or all information sharing activity. The app 22 can allow some level of identity and attribute proofing using the capabilities of the user device 14 such as, for example, camera, MEMS sensors, GPS, WIFI/3G/LTE radios, etc. For example, for ID validation, the camera can be used to get multiple images of an ID at different angles/light conditions to validate a specific hologram or watermark. The app 22 can also store user information, attributes, or attribute store encryption keys, allow for receiving of information (peer-to-peer information exchange), etc. Attribute store encryption keys may be stored using standards-based mechanisms within the app or rely on 3rd party external storage. The app 22 can also be used for redundancy of storing the attribute encryption keys to provide backup in case of a failure of the end user physical device.

In an exemplary embodiment, the app 22 and the system 10 can utilize a so-called "video selfie" which includes real-time video of the user through the user device 14 where the user repeats a given catchphrase. The catchphrase can be a randomly selected sentence. It is difficult to synthesize a video and audio to repeat the randomly selected sentence. Thus, the video selfie can be used for live video detection of the user in various aspects associated with data acquisition in the system 10.

§ 1.7 Data Model/Attribute Characteristics

Attributes are structured and grouped hierarchically. Attributes can be normalized into a format for the trust framework system 10 when they come from external information sources to allow easier use of the API 60. Attributes can be classified by the user as publicly searchable, not searchable but available to all, available upon manual authorization, and available upon direct request (automatic authorization). When the user chooses automatic authorization, an algorithm can decide when it's appropriate to disclose the information. Algorithm templates, behavior analysis, and machine learning can be used to make this determination. Attributes can be owned by an individual or by a group of individuals. When a group of individuals owns an attribute, the group defines how many authorizations are needed for disclosure, ranging from 1 to all individuals owning that attribute. Attributes have an assurance level/score associated with them. Attributes and the associated assurance level may have a shelf life and over time become less relevant or meaningful. The attributes may have an acquisition date associated to convey the how recent the attribute is to the relying party. Attribute hierarchy allows for the composite assurance level of a group or subtree of attributes. For the avoidance of doubt identity information is considered a specific type of the attribute in the trust system, attribute characteristics do apply to identity information. Additionally, user activity records and logs are considered specific types of attributes in the trust system, attribute characteristics do apply to user activity records and logs.

The trust framework system 10 has the ability to collect an attribute from a third party and attest to the authenticity of the attribute's source and that the attribute has not been modified or tampered with by using a digital signature. Also, a user can request their own attribute information. Classification of attributes can include searchable, not searchable but public, not searchable but shareable upon request, fully private. The system 10 can include normalization of attribute information such that it can be more easily consumed by a third party regardless of its source. The API 60 can provide access to the identity information and/or the attribute information. The data model can represent multiple attributes for a user with varying levels of assurance. The system 10 can include various processes to combine multiple attributes into an aggregated attribute.

§ 1.8 Proofing

The trust framework system 10 can use the user device 14 as a link between the physical and digital world to verify identity. This can include but is not limited to taking physical world credentials and making them electronic, using a video as proof (especially real-time), using of camera in phone to take a real-time picture to check identity, using location history to verify information, taking a picture of a fingerprint, using location information to prove you are physically in an area, using photos taken by third parties for verification, using other physical or online behavior and activity-based data.

The trust framework system 10 can use the user online presence and activity to assist in verification of identity. This can include aggregation of existing online accounts that require physical/detailed proofing to proof a digital identity (e.g. purchase history from online retailers, bank or loan accounts, credit card, or utility bills). Proofing may also be aided by digital behavior or activity (e.g. call or SMS history, social media activity, web consumption, or mobile application use).

Physical peer proofing can be accomplished using the user devices 14 to detect nearness of two devices to one another using various protocols and systems such as Near Field Communications (NFC), Bluetooth Low Energy (BLE), and sensory components of the device. An exemplary application can be verification of physical presence between users devices to aid in identity proofing.

The analysis of social media history can increase proofing confidence. Note, this is based on the fact that a user, through their user device 14, will be unable to create a historical, social media presence. Years of Facebook posts, Instagram pictures, LinkedIn updates, etc. are likely not fake as social media posts cannot be post dated resulting in significant time and effort requirements to falsify such information.

Correspondingly, the user device 14 can also be used to support initial and continuous proofing by capturing and analyzing a user's physical and digital behavior and activities. This can include phone usage history; how fast a user responds to texts, emails, etc.; what apps are installed on the user device 14; determination of the phone's ID (phone number, MAC address, IP address, etc.); or any types of activity on the user device 14. That is, activity on the user device 14 can provide valuable and difficult to falsify information about the user. By difficult, this is because of the patterns and data collected over time offer a globally unique data set that would require a substantial effort that would go into falsifying identity through replicating real world behaviors. For example, if the location history shows the user is at a location during work hours most of the time, it is likely this is the work location of the user. Various other behaviors can be derived from usage over time.

§ 1.9 Speed

The trust framework system 10 can enable instant dissemination of attributes in a peer-to-peer fashion with the trust system 20 acting as a aggregated cache 62 of previously obtained, attested to facts, attributes, or other pertinent information from multiple 3rd parties. Additionally, an API 60 provides a single and consistent integration to get attributes from multiple originating sources. A relying party no longer needs to perform multiple disparate integrations to data sources or wait for source dependent data acquisition response times (varies from seconds to hours or days).

§ 1.10 Limited Disclosure

The trust framework system 10 supports limited disclosure to provide the ID Owner a greater degree of control over the dissemination of facts, attributes, or other pertinent information while at the same time satisfying the minimum requirements of the Relying Party. Algorithms implemented to interpret inbound requests from 56 to 60 allow derivative attributes to be created from the source attribute to provide attribute information that remains attested to and can establish trust but protects facts, attributes, or other pertinent information. Limited Disclosure also eliminates the need for the Relying Party to have awareness or store facts, attributes, or other pertinent information. Exemplary applications can include confirmation of over 21 years of age as a yes/no answer rather than providing birth date; certification of not having a criminal background as a yes/no answer without releasing specific details about that background.

The trust framework system 10 supports a proximity-based ID with limited disclosure. Exemplary applications can include if you are involved in a traffic stop your ID could be shared with the police officer remotely without the officer getting out of the vehicle; if you are entering a building, you could use the user device 14 with the app 22 to prove relevant credentials to unlock a door; etc. Generally, the system 10 can be proximity based, limited disclosure of identity and attribute information. Either the communication capabilities of the user device 14 or the car could be used to disclose identity or attributes.

§ 1.11 Assurance Levels

The trust framework system 10 enables dynamic risk assessment based on a communicated assurance level. The system 10 attaches an assurance level to all identities, proofings, attributes and other pertinent information for risk assessment purposes. That is, all data input into the system 10 can have some assurance level. Assurance levels are dynamic and will change both over time and based on the requestors context. Time-based variability of assurance level can be based on aging/staleness of data. Variability of assurance level based on context will be dependent on a number of factors (e.g. the relying party requesting the information, quantity of aggregated sources to corroborating the information, Attribute Provider source, etc.). The assurance level may have fixed and dynamic variability based on source (e.g., Hacking/Data Loss Activity that may have happened to the source). A relying party may provide predetermined factors to determine assurance level based on how the information is planned to be used in application/context/recipient. Context variability may result in two different requests for identical information from the trust system determining two different assurance levels to convey. In some cases, the assurance level may be predetermined by the requestor but due to limited disclosure and protection of fact, attribute or pertinent information owner privacy, the requester may not have visibility to what or how the assurance level was applied to an attribute.

§ 1.12 Tracking/Audit

Also, the trust framework system 10 can detect anomalous activity, ID theft, user device 14 theft, etc. since it can maintain a normalized but anonymized view of the user's account activity. Specifically, the system 10 can maintain data related to the user over time. As described herein, the maintained data can be anonymized or opaque to the system 10, but normalized. As such, suspicious or fraudulent activity can be detected based on a new data which varies from the normalized data. In an exemplary embodiment, an alert can be provided to the user by the system 10. This fraud detection can be between the user and the system 10.

Additionally, the system 10 can also be used for affirmative consent tracking and audits. Here, two users can use the system 10 for business dealings, tracking, consent, audits, etc. Various applications are possible such as using the user devices 14, through the system 10, to provide consent to some dealing or agreement, etc.

§ 1.13 Privacy Policy of Disseminated Information

The trust framework system 10 can further allow the Relying Party 56 to express privacy policies to be applied to any of the facts, attributes, or other pertinent information the ID Owner 54 decides to disseminate. ID Owner 54 can provide consent to the dissemination based on the privacy policies. The privacy policies can be anything related to the use of the facts, attributes, or other pertinent information which constrains the use of such information by the Relying Party 56. For example, assume the Relying Party 56 requests a piece of information from the ID Owner 54 (e.g., the ID Owner 54's social security number). The privacy policy may be that the Relying Party 56 will only use this piece of information for one transaction. Specifically, the ID Owner 54 may consent to the information dissemination based on the privacy policy.

§ 2.0 Trust Framework Process

Figure 3:
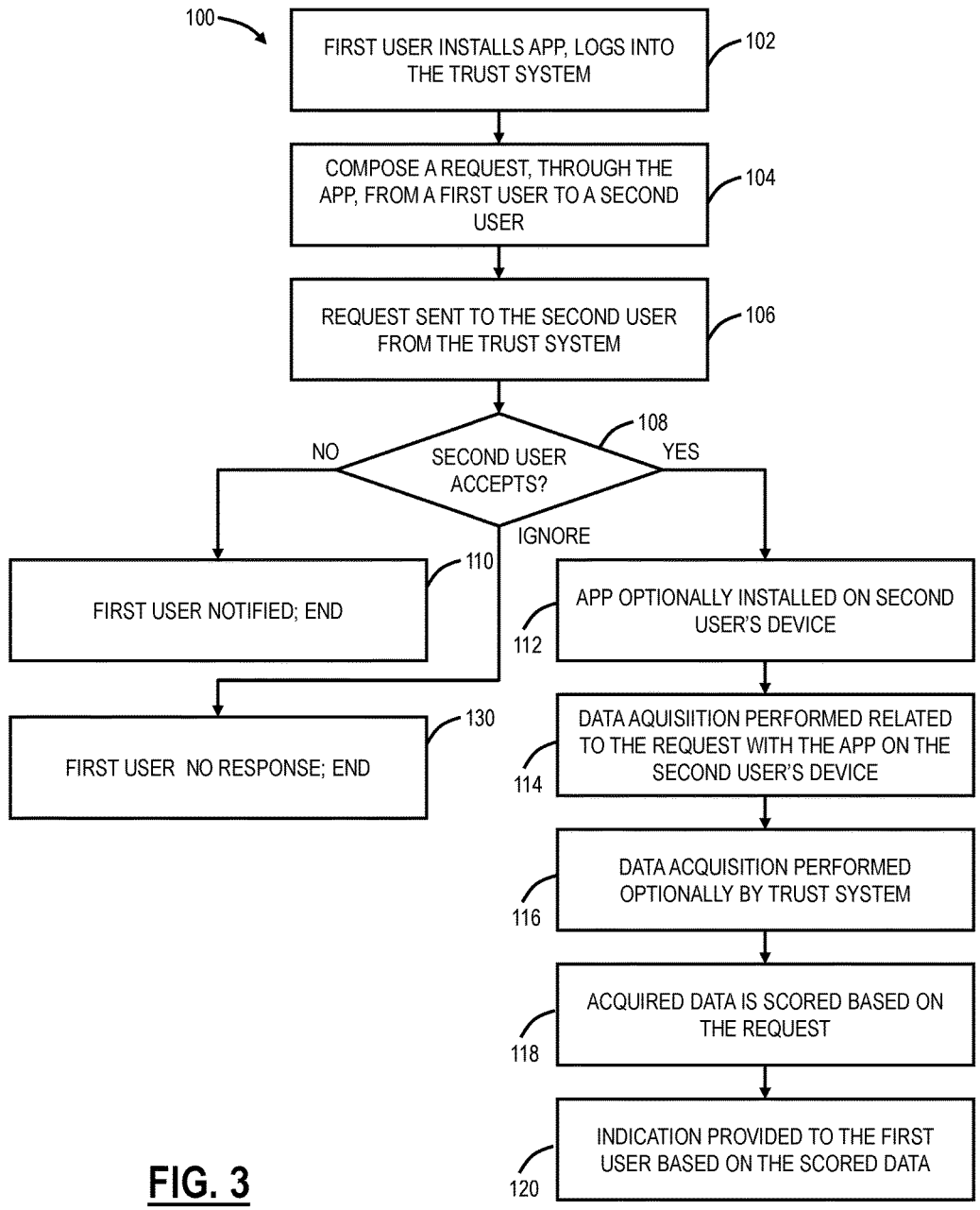
FIG. 3 is a flowchart of a process for determining trust between two users, through the trust framework system.

Referring to FIG. 3, in an exemplary embodiment, a flowchart illustrates a process 100 for determining trust between two users, through the trust framework system 10. The process 100 is performed in the trust framework system 10 with the trust system 20 and the apps 22. For illustration purposes, the process 100 is described with regard to two users, a first user, and a second user, with the first user making a request to the second user. The trust system 20 and the apps 22 are configured to perform functionality in three areas, namely i) Query Processing, ii) Data Acquisition, and iii) Data Scoring. Query processing includes user management, exchanging questions between users, etc. Data acquisition includes acquiring data from one of the users based on a request from another user. The data acquisition can be performed by the app 22, by the trust server 20, or through inquiries from third parties. Finally, the data scoring includes analyzing the acquired data to determine a response to the request.

The process 100 includes a first user installing the app 22 and logging into the trust system 20 (step 102). Again, the app 22 can be an app installed on a mobile device, e.g., iPhone, Android, Windows phone, Blackberry, etc. Alternatively, the app 22 can be locally executed through a Web Browser. Other embodiments are also contemplated. The first user logs into the trust system 20, such as creating an account on the trust system 20, using login credentials from other systems (e.g., Google ID, Apple ID, Facebook login, etc.). Optionally, the first user can provide data to the trust system 20 to provide an initial indicator of trust for the first user as part of the account creation process. Here, the request in the process 100 could be: "Is the first user providing their real name?"

The foundation of the trust framework system 10 is one user asking something of another user, to determine trustworthiness. The process 100 include the first user composing a request, through the app 22, to the second user (step 104). The request can be a query that enables the first user to discern the trustworthiness of the second user. The second user can be identified by any uniquely identifiable information such as email address, phone number for SMS text, username, etc. Offline, people determine the trustworthiness of one another through a variety of ways that generally include acquiring data from credible sources and evaluating facts to make a determination. In this manner, the trust framework system 10 seeks to provide similar functionality in an online manner.

The request can relate to any information or data the first user would use to evaluate the trustworthiness of the second user. Examples can include, without limitation:

Age validation for websites—is the second user 18 for adult websites or tobacco transactions, 21 for alcohol transactions, etc.

Validation of individuals involved in "sharing economy" interaction—ride sharing, etc.—Does my driver have a safe driving record?

Safety & health validation for online dating

Safety & financial validation of a potential roommate

Safety & security for children that are online

Safety & security for visitors entering physical premises or facilities

Criminal Background history for a temporary working looking to hire

Temporary worker looking to be hired

The request is sent to the second user from the trust system 20 (step 106). The request is sent based on the uniquely identifiable information. For example, if the second user is identified by email address, the request can be emailed, if the second user is identified by phone number, the request can be sent via text message, if the second user is already registered notification may happen within the app 22, etc. The second user can determine whether or not to participate (step 108). If the second user declines the request affirmatively or ignores the request (step 108), the first user is notified or does not receive any response, and the process 100 ends. Note, the second user's unwillingness to participate may indicate untrustworthiness to the first user (step 110), ability to ignore the first user's requests provides privacy for the second user.

If the second user accepts the request (step 108), the second user can be prompted to install the app 22 on the second user's device (step 112). Alternatively, the software code can be sent to the second user's device that is executed by a Web browser so that the second user does not need to install the app 22.

The process 100 includes performing data acquisition related to the request with the app 22 on the second user's device (step 114). Also, the process 100 can include data acquisition through the trust system 20 as well (step 116). Again, in a similar manner as offline trust determinations, the process 100 seeks to acquire facts, attributes, or other pertinent information to enable the first user to determine whether or not the second user is qualified or authorized. Importantly, the data is attested to information as well as PII, facts, attributes, and other pertinent information, but it is not directly communicated to the first user, and it is stored so only the second user can access it. Rather, the data is acquired to create derivative attributes to respond to the request e,g, yes no answers to questions about facts rather than convey the facts directly. In this manner, the data is shared with the first user on a limited basis, i.e., the first user does not need all of the PII, facts, attributes, and other pertinent information, but rather only enough information to respond to the request.

The acquired data is scored based on the request (step 118), and an indication is provided to the first user based on the scored data (step 120). The data acquisition is meant to be minimally invasive for the convenience and privacy of the second user. Also, the data acquisition is targeted, based on the specific request. The acquired data is scored to determine the assurance level of the conveyed facts. The assurance level may protect the source and privacy of the second user through abstraction of several factors. Assurance level would be conveyed as an indication of confidence, e.g., green, red, yellow; the scale of 1 to 10; etc.

§ 3.0 Data Acquisition Techniques

Figure 4:
FIG. 4 is an example 2-dimensional code, e.g., a QR code, PDF 417.

Quick Response (QR) code or another type of 2-dimensional/1-dimensional barcode—take a picture/scan of a QR code or other type of code via the user's device 14 and the app 22 of a verified document or identification card, such as a driver's license, passport, etc. Here, the app 22 and the user device 14 can be configured to decode the code and verify the information. This could be useful in the verifying of the date of birth, name, address, etc. FIG. 4 is an example 2-dimensional code 150, e.g., a PDF 417. The 2-dimensional code 150 is available on many verified documents and can be captured by the user device 14, analyzed, decoded, or decrypted to obtain verified data.

Interrogate the user device 14—in an exemplary embodiment, the app 22 can be configured to interrogate the user device 14 to learn about the second user, in the context of answering the request. This can look at the other types of apps installed on the user's device 14, the accounts such as social media, financial, etc. on the user's device 14, the user's behavior on the device 14. Also, interrogating the user device 14 can help answer the question—is the user who they say they are? That is, through analysis of email, text, phone numbers, and social media, on the user device 14, vast amounts of data can be acquired responsive to the request.

Interrogate the second user's social media accounts—this can be through interrogating the user device 14 above or separately by determining the second user's identification/username from interrogating the user device 14 and performing an analysis separately using the trust system 20.

Credit reports and other third-party information systems can be used. For example, the code scanned from above can provide a legal name for the user, which in turn can be used to query third-party information systems. The third-party information systems can be any public records database systems, including, without limitation, court records, birth records, marriage records, criminal records, professional and business license records (attorneys, doctors, engineers, etc.), voter registration records, sex offender registries, civil judgments and liens, bankruptcy records, etc. Also, credit cards, bank, utility bills, etc. can be used to verify identity and gain additional assurances on individuals identity.

§ 4.0 Request Examples and Associated Data Acquisition

§ 4.1 Age Validation

Here, the request is whether the second user is truthful relative to their age (or date of birth). This can be used for adult website access (>18), alcohol transactions (>21), any e-commerce application (user needs to be 18 or older to legally contract), age verification for social networks (e.g., >13 for a Facebook profile, etc.).

The request can be "Is the second user XX or older?" and the data acquisition can determine information to determine whether or not the answer to the request is yes or no.

The data acquisition can include obtaining information about the user that can provide a verified age. This can include, for example, scanning a PDF417 code or perform optical character recognition (OCR) on a license or other government issued ID, running a public records search, etc.

§ 4.2 Validation of Individuals Involved in "Sharing Economy" Interaction

Here, the request is whether there are warning flags related to the second user relative to the first user performing a "sharing economy" interaction. A "sharing economy" interaction can include, for example, ridesharing, meetup/dating apps, freelance services, accommodations, and the like. The warning flags are meant to help the first user have more information before deciding to enter into the interaction. In this manner, the request is meant to assist the first user in determining whether or not trust is warranted.

The response or result can be a green (appears safe), yellow (unsure), or red (warning) as well as a numerical value (1-10, 10 being safest). The warning flags can be determined by looking at various data points, such as, without limitation:

Is the second user's name, address, age, etc. valid? That is, is the information provided by the second user to the first user correct?

Does the second user have any records that would dissuade the first user from entering into a "sharing economy" interaction? For example, arrests, sex offender registration, etc.

Does the second user's behavior lead to anything that would dissuade the first user from entering into a "sharing economy" interaction? For example, upon interrogating the second user's device 14, are they warning flags detected? Significant profanity may dissuade someone from allowing their children to ride with the second user, etc.

The data acquisition can include obtaining information about the user that can provide information to determine if warning flags exist. This can include, for example, scanning a PDF417 code on a license, or other government-issued ID, running a public records search, interrogating the user device 14, etc.

§ 4.3 Safety & Health Validation for Online Dating

Similar to the "sharing economy" interaction above, online dating is a specific type of "sharing economy" interaction. In addition to the description above, online dating can also need more relevant health information. Here, the request is whether there are warning flags related to the second user relative to the first user dating or entering into a romantic relationship. The response or result can be a green (appears safe), yellow (unsure), or red (warning) as well as a numerical value (1-10, 10 being safest).

In addition to everything above in the "sharing economy" interaction, the data acquisition can include obtaining medical information, records, etc. For example, one aspect could be a Sexual Transmitted Disease (STD) test, and the system 10 can maintain privacy and not provide the responses or results to the first user, but provide an indication of whether or not there are potential issues from a trust perspective.

§ 4.4 Other Scenarios

As described herein, other scenarios may include Safety & financial validation of a potential roommate, Safety & security for children that are online, Safety & security for visitors entering physical premises or facilities, proof the user is who they say they are for a financial transaction or approval, etc.

These are all similar to above, with each different scenario being handled by the trust framework system 10. The differences for each different scenario are 1) what the request is, 2) what data is needed to answer the request, and 3) what algorithm is used to analyze the data.

With respect to the data analysis algorithm, some requests are discrete—is the user old enough? Does the user have a criminal record? Is the user telling the truth about a verifiable fact? Etc.

Other requests require a heuristics approach to providing an answer. For example, can I trust the driver of my ride-sharing service to take me to my destination? Can I trust this person to go on a date? Etc.

The heuristics approach can take data and perform an analysis to come ultimately up with a green, yellow, red or some other objective criteria to answer the request.

§ 5.0 Exemplary Server Architecture

Figure 5:
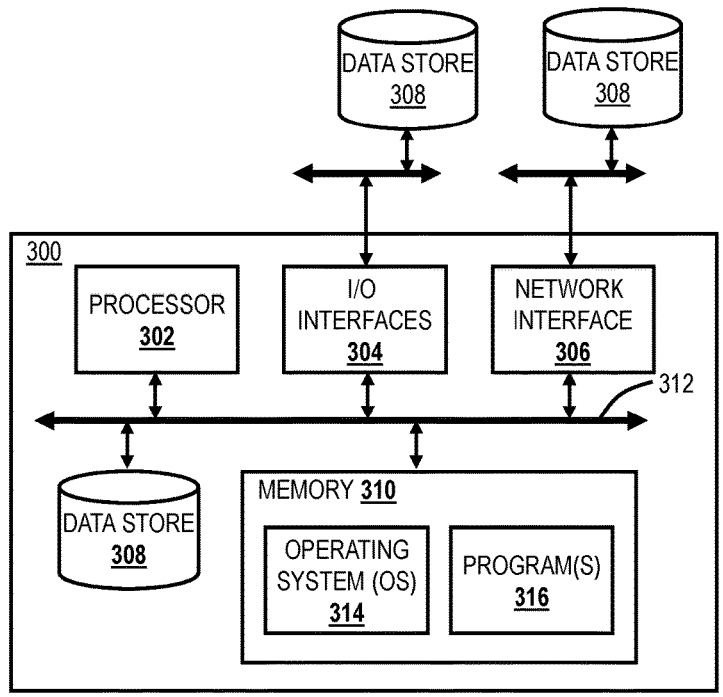
FIG. 5 is a block diagram of a server which may be used in the trust framework system, in other systems, or stand-alone.

Referring to FIG. 5, in an exemplary embodiment, a block diagram illustrates a server 12 which may be used in the system 10, in other systems, or stand-alone. The server 12 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 5 depicts the server 12 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example, but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 12, a semiconductor based microprocessor (in the form of a microchip or chip set), or generally any device for executing software instructions. When the server 12 is in operation, the processor 302 is configured to execute software stored within the memory 310, to communicate data to and from the memory 310, and to generally control operations of the server 12 pursuant to the software instructions. The I/O interfaces 304 may be used to receive user input from and/or for providing system output to one or more devices or components. User input may be provided via, for example, a keyboard, touchpad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 12 to communicate on a network, such as the Internet, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 12 such as, for example, an internal hard drive connected to the local interface 312 in the server 12. Additionally in another embodiment, the data store 308 may be located external to the server 12 such as, for example, an external hard drive connected to the I/O interfaces 304 (e.g., SCSI or USB connection). In a further embodiment, the data store 308 may be connected to the server 12 through a network, such as, for example, a network-attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

§ 5.1 Exemplary Mobile Device Architecture

Figure 6:
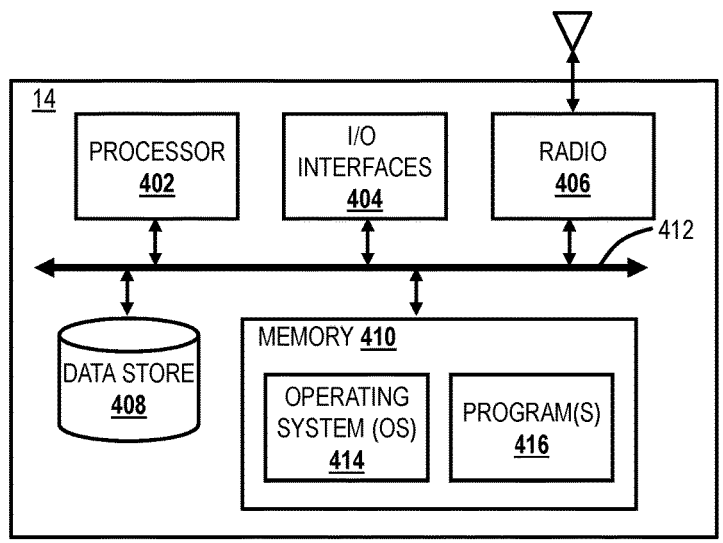

Referring to FIG. 6, in an exemplary embodiment, a block diagram illustrates a user device 14, which may be used in the system 10 or the like. The user device 14 can be a digital device that, in terms of hardware architecture, generally includes a processor 402, input/output (I/O) interfaces 404, a radio 406, a data store 408, and memory 410. It should be appreciated by those of ordinary skill in the art that FIG. 6 depicts the user device 14 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example, but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the user device 14, a semiconductor-based microprocessor (in the form of a microchip or chip set), or generally any device for executing software instructions. When the user device 14 is in operation, the processor 402 is configured to execute software stored within the memory 410, to communicate data to and from the memory 410, and to generally control operations of the user device 14 pursuant to the software instructions. In an exemplary embodiment, the processor 402 may include a mobile-optimized processor such as optimized for power consumption and mobile applications. The I/O interfaces 404 can be used to receive user input from and/or for providing system output. User input can be provided via, for example, a keypad, a touch screen, a scroll ball, a scroll bar, buttons, barcode scanner, and the like. Input can also include Near Field Communications (NFC) or the like, such as where two devices touch or are in close proximity to one another. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the user device 14. Additionally, the I/O interfaces 404 may further include an imaging device, i.e. camera, video camera, etc.

The radio 406 enables wireless communication to an external access device or network. Any number of suitable wireless data communication protocols, techniques, or methodologies can be supported by the Radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs and provides scheduling, input-output control, file and data management, memory management, and communication control and related services. The programs 416 may include various applications, add-ons, etc. configured to provide end user functionality with the user device 14. For example, exemplary programs 416 may include, but not limited to, a web browser, social networking applications, streaming media applications, games, mapping and location applications, electronic mail applications, financial applications, and the like. In a typical example, the end user typically uses one or more of the programs 416 along with a network such as the system 10.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

§ 6.0 Personal Data Store

The data storage 62, 64 can be used to store and manage a personal data store for a user in the trust system 20. The personal data store can be cryptographic, accessible only by the user for purposes of interacting with the trust system and not accessible by the trust system 20 except as allowed by the user. The personal data store can be stored only in the cloud 52, in the data storage 62, only on the user's local device in the data storage 64, or a combination of both, i.e., mirrored. For example, the personal data store can be managed by the user through the app 22 and maintained securely by the trust system 20. A key aspect of the personal data store is that the information contained therein belongs to the user, not the trust system 20. The trust system 20's access to the information is limited to whatever the user allows, such as for purposes of establishing trust. The user has the sole discretion on sharing the information in the personal data store, to whom, how much, for how long, etc.

The personal data store can store attributes with information about the user. For example, core attributes can include a user's name, date of birth, Social Security Number (SSN), home address, place of employment, and the like. Additionally, the attributes can include any piece of information which can be attached to the user, such as, without limitation, professional certifications, background checks, credit scores, academic credentials, professional memberships, and the like.

Each individual attribute is cryptographically signed by the Attribute Provider 58 to prevent tampering. As described herein, the Attribute Provider 58 is the issuing authority for the attribute. For example, a school can issue academic credentials, a professional licensing board can issue professional memberships, a credit score authority can issue credit scores and the like. The access to individual attributes can be enforced using public key encryption. Each attribute value is encrypted using a unique (attribute specific) symmetric key. The symmetric key is encrypted with the public key of the entity which should be able to access the information (e.g., the user 54 himself, the Attribute Provider 58, or the Relying Party 56). A symmetric key encrypted with a public key constitutes a granular data sharing control at the attribute level. The same thing can be accomplished by directly encrypting the value multiple times using the public key of the entities to share with. In an exemplary embodiment, the personal data store resides in the cloud, i.e., the data storage 62, and the personal private key resides in the device, e.g., the data storage 64, but a less secure alternative where both the data and the key are local to the device is viable.

In an exemplary embodiment, the personal data store can use key wrapping with an asymmetric key used to wrap a symmetric key. Here, the symmetric key is used to encrypt an attribute whereas the asymmetric key is used to grant access to the symmetric key which itself provides access to the plaintext. Symmetric-key algorithms are algorithms for cryptography that use the same cryptographic keys for both encryption of plaintext and decryption of ciphertext. The keys may be identical, or there may be a simple transformation to go between the two keys. The keys, in practice, represent a shared secret between two or more parties that can be used to maintain a private information link. This requirement that both parties have access to the secret key is one of the main drawbacks of symmetric key encryption, in comparison to public-key encryption (also known as asymmetric key encryption).

Public-key cryptography, or asymmetric cryptography, is any cryptographic system that uses pairs of keys: public keys that may be disseminated widely paired with private keys which are known only to the owner. There are two functions that can be achieved: using a public key to authenticate that a message originated with a holder of the paired private key; or encrypting a message with a public key to ensure that only the holder of the paired private key can decrypt it. Encrypting attributes using unique symmetric keys that are not known to the trust system 20, ensures that the trust system 20 does not have access to the data in the personal data store—only the user can access the attributes in the personal data store.

§ 6.1 Attribute Integrity and Provenance

The trust system 20 can include various processes and techniques to safeguard the integrity and provenance of the attributes in the personal data store. For integrity, the trust system 20 has the Attribute Provider 58, i.e., the source of the attribute, add a signature to a payload that is inclusive of the attribute content. This can prevent tampering of the attribute value. Similarly, transactions involving input and output attributes are signed by the attribute provider to allow verification of provenance, which is a guide to authenticity or quality of the attribute. As described herein, an attribute is some form of data related to the user's identity.

The Attribute Provider 58 requires input attributes to generate output attributes. The input attributes can include self-asserted attributes, i.e., any attribute provided by the ID Owner 54, and third-party asserted attributes, i.e., any attribute provided by a third-party such as the Attribute Provider 58. Thus, the inputs can be a combination of the self-asserted attributes and the third-party asserted attributes. For example, a background check can require the user's name, SSN, address, etc. and the output attribute is the completed background check. In another example, a school can require the user's name to output academic credentials. Various other examples are contemplated. Inputs are typically used for identity resolutions and database lookups, but can also be used for verifications, calculations, etc. When an output is generated by the Attribute Provider 58, a transaction is generated containing all inputs, all outputs, and descriptive information about the Attribute Provider 58's process. That transaction can be signed using the Attribute Provider 58's private key. Furthermore, inputs and outputs corresponding hash pointers are used in the signing operation. This enables attribute provenance verification without disclosing the value of the attribute.

Attribute provenance relates to tying the input attributes to the output attribute. The following description illustrates examples of attribute provenance, and the following terms are used herein:

$\overline{\text{Text}}$ denotes ciphertext that results from encrypting Text;

$key_{attribute}$ denotes the symmetric key used to encrypt an attribute value;

$key_{entity}$ denotes the public asymmetric key associated with an entity (such as the Attribute Provider 58, the Relying Party 56, or the ID Owner 54) and can be used to encrypt content or to verify signatures;

$key_{entity}'$ denotes the private asymmetric key associated with entity (such as the Attribute Provider 58, the Relying Party 56, or the ID Owner 54) and can be used to decrypt content or to create signatures;

ps256_sign PS256 signature algorithm, others can also be used;

aes_dec decrypt using Advanced Encryption Standard algorithm, others can also be used;

aes_enc encrypt using Advanced Encryption Standard algorithm, others can also be used;

rsa_dec decrypt using RSA algorithm, others can also be used;

rsa_enc encrypt using RSA algorithm, others can also be used; and sha256 SHA256 hash algorithm, others can also be used.

In an exemplary attribute provenance operation where the Attribute Provider 58 is providing a background check, in a first step, the ID Owner 54 enters self-asserted attributes such as SSN, Name, and DOB (Date of Birth). The following unique symmetric keys can be generated for each of these attributes:

$key_{SSN}$=random(len=256bits)

$key_{Name}$=random(len=256bits)

$key_{DOB}$=random(len=256bits)

Ciphertext is created for each attribute:

$\overline{\text{SSN}}$=aes_enc(SSN,$key_{SSN}$)

$\overline{\text{Name}}$=aes_enc(Name,$key_{Name}$)

$\overline{\text{DOB}}$=aes_enc(DOB,$key_{DOB}$)

Symmetric keys are encrypted with ID Owner 54's public key, allowing access to the ID Owner 54 (IDO1), creating the following key shares:

```
{
    "shareWith": IDO1,
    "key": rsa_enc(keySSN; k_IDO1)
}
{
    "shareWith": IDO1,
    "key": rsa_enc(keyName; k_IDO1)
}
{
    "shareWith": IDO1,
    "key": rsa_enc(key_DOB; k_IDO1)
}
```

The following attributes and assertions are produced as a result:

```
ssn___ido1___attr = {
    "transactionId": [id],
    "metadata": {
        "iss": IDO1,
        "sub": IDO1,
        "iat": [timestamp],
        "nbf": [timestamp],
        "exp": [timestamp],
        "attributeType" : "core.ssn"
    },
    "content": SSN
    "sig": ps256_sign(transactionId + metadata + SSN),
    "hashpointer": sha256(transactionId + metadata),
    "shares": [
        {
            'shareWith': IDO1,
            'key': rsa_enc(key_SSN; k_IDO1)
        }
    ]
}
name___ido1___attr = {
    "transactionId": [id],
    "metadata": {
        "iss": IDO1,
        "sub": IDO1,
        "iat": [timestamp],
        "nbf": [timestamp],
        "exp": [timestamp],
        "attributeType" : "core.name"
    },
    "content": Name,
    "sig": ps256_sign(transactionId + metadata + Name),
    "hashpointer": sha256(transactionId + metadata),
    "shares": [
        {
            'shareWith': IDO1,
            'key': rsa_enc(keyName; k_IDO1)
        }
    ]
}
dob___ido1___attr = {
    "transactionId": [id],
    "metadata": {
        "iss": IDO1,
        "sub": IDO1,
        "iat": [timestamp],
        "nbf": [timestamp],
        "exp": [timestamp],
        "attributeType" : "core.dob"
    },
    "content": DOB,
    "sig": ps256_sign(transactionId + metadata + DOB),
    "hashpointer": sha256(transactionId + metadata),
    "shares": [
        {
            'shareWith': IDO1,
            'key': rsa_enc(key_DOB; k_IDO1)
        }
    ]
}
{
    "transaction_id": [id],
    "inputs": [
    ],
    "outputs": [
        ssn___ido1___attr.hashpointer,
        name___ido1___attr.hashpointer,
        dob___ido1___attr.hashpointer,
    ],
    "assertion": "self-asserted-attributes",
    "sig": ps256_sign(inputs + outputs; k_IDO1')
}
```

In a second step, the ID Owner 54 (IDO1) authorizes the Attribute Provider 58 to perform the background check. The ID Owner 54 uses its private key to decrypt its own share for inputs needed by the Attribute Provider 58 and re-encrypts it with the Attribute Provider 58's public key:

```
{
    "shareWith": Background Check AP,
    "key": rsa_enc(key_SSN; k_BackgroundCheckAP)
}
{
    "shareWith": Background Check AP,
    "key": rsa_enc(key_Name; k_BackgroundCheckAP)
}
{
    "shareWith": Background Check AP,
    "key": rsa_enc(key_DOB; k_BackgroundCheckAP)
}
```

The Attribute Provider 58 decrypts inputs needed for the background check using the above key shares:

$SSN = aes\_dec(\overline{SSN}, key_{SSN})$ $Name = aes\_dec(\overline{Name}, key_{Name})$ $DOB = aes\_dec(\overline{DOB}, key_{DOB})$ The Attribute Provider 58 uses inputs to retrieve a background check, produces a result and encrypts it using a symmetric key. Also, the key is shared with the ID Owner 54 (IDO1):

```
key_Background Check Result = random(len=256bits)
Background Check Result = aes_enc(Background Check Result,
Key_Background Check Result
{
    "shareWith": IDO1,
    "key": rsa_enc(key_Background Check Result; k_IDO1)
}
```

The following attributes and assertions are produced as a result:

```
background_check_result___background_check_ap___attr = {
    "transactionId": [id],
    "metadata": {
        "iss": Background Check AP,
        "sub": IDO1,
        "iat": [timestamp],
        "nbf": [timestamp],
        "exp": [timestamp],
        "attributeType" : "verification.background-check-result"
    },
    "content":,Background Check Result
    "sig": ps256_sign(transactionId + metadata + Background Check Result),
    "hashpointer": sha256(transactionId + metadata),
    "shares": [
        {
        'shareWith': IDO1,
        'key': rsa_enc(key_{BackgroundCheckResult}; k_{IDO1})
        }
    ]
}
{
    "transaction_id": [id],
    "inputs": [
        ssn___ido1___attr.hashpointer,
        name___ido1___attr.hashpointer,
        dob___ido1___attr.hashpointer,
    ],
    "outputs": [
        background_check_result___background_check_ap___attr.hashpointer,
    ],
    "assertion": "background-check",
    "sig": ps256_sign(inputs + outputs; k_{BackgroundCheckAP} ')
}
```

In a third step, the ID Owner 54 provides self-asserted attributes for the Driver's license image and live video selfie. The following unique symmetric keys are generated for each attribute:

$$key_{DL\ Image} = random(len=256bits)$$

$$key_{Video\ Selfie} = random(len=256bits)$$

Ciphertext is created for each attribute:

$$\overline{DLImage} = aes\_enc(DL\ Image, key_{DL\ Image})$$

$$\overline{VideoSelfie} = aes\_enc(Video\ Selfie, key_{Video\ Selfie})$$

Symmetric keys are encrypted with the ID Owner 54's public key, allowing access to the ID Owner 54, creating the following key shares:

```
{
    "shareWith": IDO1,
    "key": rsa_enc(key_{DL Image}; k_{IDO1})
}
{
    "shareWith": IDO1,
    "key": rsa_enc(key_{Video Selfie}; k_{IDO1})
}
```

The following attributes and assertions are produced as a result:

```
dl_image___ido1___attr = {
    "transactionId": [id],
    "metadata": {
        "iss": IDO1,
        "sub": IDO1,
        "iat": [timestamp],
        "nbf": [timestamp],
```

-continued

```
        "exp": [timestamp],
        "attributeType" : "id.dl-image"
    },
    "content": DL Image,
    "sig": ps256_sign(transactionId + metadata + DL Image),
    "hashpointer": sha256(transactionId + metadata),
    "shares": [
        {
            'shareWith': IDO1,
            'key': rsa_enc(key_{DL Image}; k_{IDO1})
        }
    ]
}
video_selfie___ido1___attr = {
    "transactionId": [id],
    "metadata": {
        "iss": IDO1,
        "sub": IDO1,
        "iat": [timestamp],
        "nbf": [timestamp],
        "exp": [timestamp],
        "attributeType" : "core.video-selfie"
    },
    "content": Video Selfie,
    "sig": ps256_sign(transactionId + metadata + Video Selfie),
    "hashpointer": sha256(transactionId + metadata),
    "shares": [
        {
            'shareWith': IDO1,
            'key': rsa_enc(key_{VideoSelfie}; k_{IDO1})
        }
    ]
}
{
    "transaction_id": [id],
    "inputs": [
    ],
    "outputs": [
        dl_image___ido1___attr.hashpointer,
        video_selfie___ido1___attr.hashpointer,
    ],
```

```
    "assertion": "self-asserted-attributes",
    "sig": ps256_sign(inputs + outputs; k_{IDO1'})
}
```

In a further step, the ID Owner 54 authorizes an Identity Verifier Attribute Provider 58 to perform identity proofing. The ID Owner 54 uses its private key to decrypt its own share for inputs needed by Identity Verifier Attribute Provider 58 and re-encrypts it with the Identity Verifier Attribute Provider 58's public key:

```
{
    "shareWith": Identity Verifier AP,
    "key": rsa_enc(key_{DL Image}; k_{IdentityVerifierAP})
}
{
    "shareWtih": Identity Verifier AP,
    "key": rsa_enc(key_{Video Selfie}; k_{IdentityVerifierAP})
}
```

The Identity Verifier Attribute Provider 58 decrypts inputs needed using the above key shares:

```
key_{Verified Name}=random(len=256bits)
key_{Verified DOB}=random(len=256bits)
Verified Name =aes_enc(Verified Name, key_{Verified Name})
Verified DOB =aes_enc(Verified DOB, key_{Verified DOB})
{
    "shareWith": IDO1,
    "key": rsa_enc(key_{Verified Name}; k_{IDO1})
}
{
    "shareWith": IDO1,
    "key": rsa_enc(key_{Verified DOB}; k_{IDO1})
}
```

The following attributes and assertions are produced as a result:

```
verified_name___indentity_verifier_ap___attr = {
    "transactionId": [id],
    "metadata": {
        "iss": Identity Verifier AP,
        "sub": IDO1,
        "iat": [timestamp],
        "nbf": [timestamp],
        "exp": [timestamp],
        "attributeType" : "core.name"
    },
    "content": Verified Name,
    "sig": ps256_sign(transactionId + metadata + Verified Name),
    "hashpointer": sha256(transactionId + metadata),
    "shares": [
        {
            'shareWith': IDO1,
            'key': rsa_enc(key_{VerifiedName}; k_{IDO1})
        }
    ]
}
verified_dob___identity_verifier_ap___attr = {
    "transactionId": [id],
    "metadata": {
        "iss": Identity Verifier AP,
        "sub": IDO1,
        "iat": [timestamp],
        "nbf": [timestamp],
        "exp": [timestamp],
        "attributeType" : "core.dob"
    },
    "content": Verified DOB,
    "sig": ps256_sign(transactionId + metadata + Verified DOB),
    "hashpointer": sha256(transactionId + metadata),
    "shares": [
        {
            'shareWith': IDO1,
            'key': rsa_enc(key_{VerifiedDOB}; k_{IDO1})
        }
    ]
}
{
    "transaction_id": [id],
    "inputs": [
        dl_image___ido1___attr.hashpointer,
    ],
    "outputs": [
        name___indentity_verifier_ap___attr.hashpointer,
        dob___indentity_verifier_ap___attr.hashpointer,
    ],
    "assertion": "successful-id-verification",
    "sig": ps256_sign(inputs + outputs; k_{IndentityVerifierAP'})
}
{
    "transaction_id": [id],
    "inputs": [
        dl_image___ido1___attr.hashpointer,
        video_selfie___attr.hashpointer,
    ],
    "outputs": [
    ],
    "assertion": "successful-id-face-match",
    "sig": ps256_sign(inputs + outputs; k_{IndentityVerifierAP'})
}
{
    "transaction_id": [id],
    "inputs": [
        name___ido1___attr.hashpointer,
        dob___ido1___attr.hashpointer,
    ],
    "outputs": [
        name___indentity_verifier_ap___attr.hashpointer,
        dob___indentity_verifier_ap___attr.hashpointer,
    ],
    "assertion": "plaintext-comparison-match",
    "sig": ps256_sign(inputs + outputs; k_{IndentityVerifierAP'})
}
```

In a fifth step, the ID Owner 54 authorizes a SSN Verifier Attribute Provider 58 to perform SSN verification. The ID Owner 54 uses its private key to decrypt its own share for inputs needed by SSN Verifier Attribute Provider 58 and re-encrypts it with the SSN Verifier Attribute Provider 58's public key:

```
{
    "shareWith": SSN Verifier AP,
    "key": rsa_enc(key_{SSN}; k_{SSNVerifierAP})
}
{
    "shareWith": SSN Verifier AP,
    "key": rsa_enc(key_{Name}; k_{SSNVerifierAP})
}
{
    "shareWith": SSN Verifier AP,
    "key": rsa_enc(key_{DOB}; k_{SSNVerifierAP})
}
```

The SSN Verifier Attribute Provider 58 decrypts inputs needed using the above key shares:

$$SSN=aes\_dec(\overline{SSN}, key_{SSN})$$

$$Name=aes\_dec(\overline{Name}, key_{Name})$$

$$DOB=aes\_dec(\overline{DOB}, key_{DOB})$$

The SSN Verifier Attribute Provider 58 decrypt uses inputs to perform SSN verification, produces a result in the form of a verified SSN attribute and encrypts it using a symmetric key. Also, the key is shared with the ID Owner 54:

```
key_{Verified SSN}=random(len=256bits)
\overline{Verified SSN} =aes_enc(Verified SSN, key_{Verified SSN})
{
    "shareWith": IDO1,
    "key": rsa_enc(key_{Verified SSN}; k_{IDO1})
}
```

The following attributes and assertions are produced as a result:

```
verified_ssn___ssn_verifier_ap___attr = {
    "transactionId": [id],
    "metadata": {
        "iss": SSN Verifier AP,
        "sub": IDO1,
        "iat": [timestamp],
        "nbf": [timestamp],
        "exp": [timestamp],
        "attributeType" : "core.ssn"
    },
    "content": \overline{Verified SSN},
    "sig": ps256_sign(transactionId + metadata + Verified SSN),
    "hashpointer": sha256(transactionId + metadata),
    "shares": [
        {
            'shareWith': IDO1,
            'key': rsa_enc(key_{VerifiedSSN}; k_{IDO1})
        }
    ]
}
{
    "transaction_id": [id],
    "inputs": [
        ssn___ido1___attr.hashpointer,
    ],
    "outputs": [
        ssn___ssn_verifier_ap___attr.hashpointer,
    ],
    "assertion": "successful-ssn-verification",
    "sig": ps256_sign(inputs + outputs; k_{SSNVerifierAP'})
}
{
    "transaction_id": [id],
    "inputs": [
        ssn___ido1___attr.hashpointer,
    ],
    "outputs": [
        ssn___ssn_verifier_ap___attr.hashpointer,
    ],
    "assertion": "plaintext-comparison-match",
    "sig": ps256_sign(inputs + outputs; k_{SSNVerifierAP'})
}
```

In a sixth step, the ID Owner 54 shares the result of the background check with the Relying Party 56.

```
{
    "shareWith": RP1,
    "key": rsa_enc(key_{Background Check Result}; k_{RP1})
}
```

At this point, it is possible to verify that despite ID Owner 54's identity not being verified at the time the Background Check Result was produced, the fact that the self-asserted identity was later verified can be used to give the Relying Party 56 the assurance that it is equivalent to a Background Check done on a verified identity. The assertions from the preceding steps above can be used to support that the background check originally retrieved on an unverified identity, is now equivalent to a background check retrieved on a verified identity.

In a seventh step, the ID Owner 54 requires verification of a new legal name, enters the self-asserted new legal name. The following attributes and assertions are created:

```
new_name___ido1___attr = {
    "transactionId": [id],
    "metadata": {
        "iss": IDO1,
        "sub": IDO1,
        "iat": [timestamp],
        "nbf": [timestamp],
        "exp": [timestamp],
        "attributeType" : "core.name"
    },
    "content": \overline{New Name},
    "sig": ps256_sign(transactionId + metadata + New Name)
    "hashpointer": sha256(transactionId + metadata),
    "shares": [
        {
            'shareWith': IDO1,
            'key': rsa_enc(key_{NewName}; k_{IDO1})
        }
    ]
}
{
    "transaction_id": [id],
    "inputs": [
    ],
    "outputs": [
        new_name___ido1___attr.hashpointer,
    ],
    "assertion": "self-asserted-attributes",
    "sig": ps256_sign(inputs + outputs; k_{IDO1'})
}
```

In an eight step, the ID Owner 54 authorizes a Name Change Verifier Attribute Provider 58 to perform verification. The ID Owner 54 uses its private key to decrypt its own share for inputs needed by Name Change Verifier Attribute Provider 58 and re-encrypts it with the Name Change Verifier Attribute Provider 58's public key:

```
{
    "shareWith": Name Change Verifier AP,
    "key": rsa_enc(key_{Name}; k_{NameChangeVerifierAP})
}
{
    "shareWith": Name Change Verifier AP,
    "key": rsa_enc(key_{New Name}; k_{NameChangeVerifierAP})
}
```

The Name Change Verifier Attribute Provider 58 decrypts inputs needed using the above key shares:

Name=aes_dec($\overline{Name}$,key_{Name})

New Name=aes_dec($\overline{NewName}$,key_{New Name})

The Name Change Verifier Attribute Provider 58 decrypts uses inputs to perform verification, produces a result in the form of a verified new name attribute and encrypts it using a symmetric key. Also, the key is shared with the ID Owner 54:

```
key_{Verified New Name}=random(len=256bits)
Verified New Name =aes_enc(Verified New Name, key_{Verified New Name})
{
    "shareWith": IDO1,
    "key": rsa_enc(key_{Verified New Name}, k_{IDO1})
}
```

The following attributes and assertions are produced as a result:

```
verified_new_name__name_change_verifier_ap__attr = {
    "transactionId": [id],
    "metadata": {
        "iss": Name Change Verifier AP,
        "sub": IDO1,
        "iat": [timestamp],
        "nbf": [timestamp],
        "exp": [timestamp],
        "attributeType" : "core.name"
    },
    "content": Verified New Namee,
    "sig": ps256_sign(transactionId + metadata + Verified New Name),
    "hashpointer": sha256(transactionId + metadata),
    "shares": [
        {
            'shareWith': IDO1,
            'key': rsa_enc(key_{VerifiedNewName}, k_{IDO1})
        }
    ]
}
{
    "transaction_id": [id],
    "inputs": [
        name__attr.hashpointer,
        new_name__attr.hashpointer,
    ],
    "outputs": [
        verified_new_name__name_change_verifier_ap__attr.hashpointer,
    ],
    "assertion": "successful-name-change-verification",
    "sig": ps256_sign(inputs + outputs; k_{NameChangeVerifierAP})
}
```

The last assertion can be used to link the results of the Background check to the new name, even though the result of the background check was retrieved using the old name.

Here are some different exemplary types of assertions:

Mathematical: Equality/Inequality between attributes; Derivation, e.g., Dec. 1, 1970 DOB corresponds to over 21; Business logic derivation, e.g., Boolean that indicates 'no felonies and no violent misdemeanors.'

String Derivation: Extracting a string to reduce disclosure of information. Example: retrieving only the City and State portion of a complete address Digital Record such as criminal records, credit history, medical records, drug test, and the like.

Analysis, reporting, summarization of data such as credit report, personality tests, psychological evaluations, and the like.

Media analytics/biometrics such as picture/video/voice matching, fingerprints, retina, iris, and the like.

Affidavit such as a third-party attests under oath.

ID verification (with or without record validation) such as e-passports, driver license scans, marriage licenses.

Assertions from sensors such as Microelectromechanical systems (MEMS), drones, Internet of Things (IoT), and the like.

In the foregoing example, hash pointers are used to provide the attribute provenance, namely tying the inputs to the outputs, i.e., a technique to provide a relationship between the inputs and outputs. The hash pointers can be used to describe the relationships without disclosing the attribute values. Hash pointers are used to address a particular structure, namely the relationship between inputs and outputs, as well as to check the integrity of contents. The hash pointers can be used to describe the relationships of which inputs are used for which outputs, at multiple depths. The hash pointer is determined using a hash algorithm, such as SHA 256 or the like, based on a transaction ID and metadata.

§ 6.2 Identity Resolution Attributes

Identity resolution attributes (used for record linking attributes) are attributes that have the following properties: by themselves or when combined with other attributes, uniquely identify an individual; change fairly infrequently; are applicable to a large portion of the population that needs to be identified. Some examples include social security number, full name, date of birth, zip code, driver's license number. Identity resolution attributes are very commonly used as inputs to obtain other attributes, such as background checks, academic records and credit reports.

Figure 7:
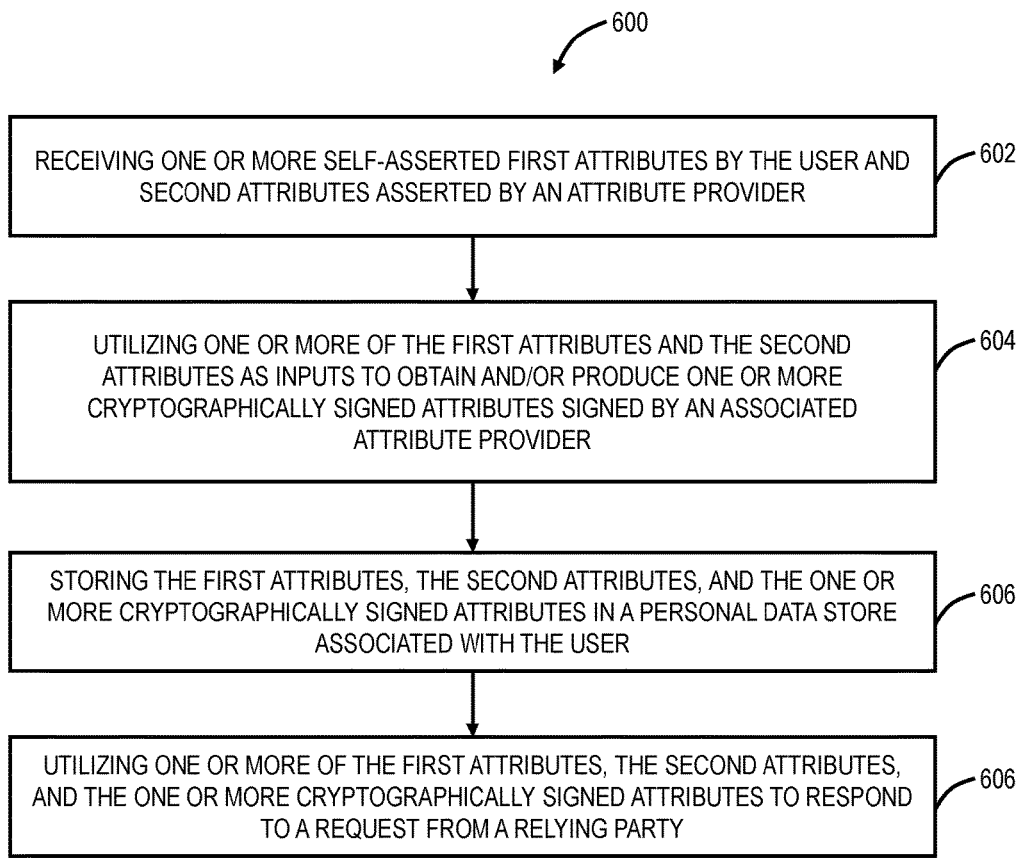
FIG. 7 is a flowchart of a computer-implemented method for managing a personal data store binding one or more identities associated with a user.

In an exemplary embodiment, the attribute provenance scheme (e.g., as shown in FIG. 7) can be used to represent relationships between multiple identity resolution attributes. The attributes 500 can include a pointer or some logical link to one another to bind them together. For example, different first name/last name combinations can be asserted as equivalent due to marriage, divorce, correction of clerical error, nicknames, etc. by an AP that can verify the necessary documentation. The purpose here is to re-use attributes when a strong enough relationship exists between identity resolution attributes.

§ 6.3 Identity Binding in the Personal Data Store

As described herein, an identity is any piece of information that uniquely identifies an individual. Identity binding in the personal data store includes binding multiple identities together to combine the benefits from each one of them. Note, the identities or pieces of information can be represented in the personal data store as the attributes 500. The following illustrate some exemplary embodiments of identity binding, and those of ordinary skill in the art will recognize various other examples are also contemplated.

A public key identity has useful cryptographic properties that enable encryption and signing operations. A user profile in the trust system 20 and the personal data store will always have at least one (primary) public key identity. E-mail, phone numbers, social logins, etc. are good identifiers for others to initiate contact. These are particularly useful to allow reception of incoming information requests. A "Traditional identity," like the combination of First Name, Last Name, DOB, SSN, etc. allows verification of traditional real-world attributes, like background checks, credit scores, income verification, driving record, and so forth.

The biometric information allows the validation of physical presence. Some example use cases include proofing upon accepting a sharing economy job (e.g., ridesharing driver, etc.), high assurance identity upon sharing sensitive information (e.g., dating site—sharing answers to medical questions), etc. Physical cards such as credit cards, government-issued identification cards, etc. are good for initiating the sharing of information with a physical action that proves possession of the card (scanning a credit card could automatically share information from a picture-id).

The binding between the multiple identities needs to be continuously verified through the process of identity proofing. Different levels of proofing are supported with varying levels of assurance, such as in-person, real-time video conference, document scanning, document scanning with live video selfie, etc.

§ 6.1 Identity Proofing

Identity proofing refers to various techniques to increase the veracity of identity information. Some exemplary embodiments of identity proofing include using a video selfie where the user enunciates a randomly selected sentence by the trust system 20 to verify the video is taken. The biometric information (facial features) can be used to match against a biometric document (driver's license picture, electronic passport) in the video selfie. Speech recognition can be used to validate that the correct sentence was enunciated to prevent replay/presentation attacks. A manual and automatic approach can be used to validate the audio and video are properly synchronized. Also, micro-expression detection can be used in the video selfie to validate the video's authenticity.

In another exemplary embodiment, conventional postal delivery services or electronic mail can be used to send a cryptographic message such as via a two-dimensional code (e.g., QR code) that can be scanned by the mobile app 22. This provides a good level of address validation (physical for postal services and electronic for email). This also provides a good level of identity validation (which could be made higher depending on the level of postal service used, such as signature validation by the mail carrier).

Other identity-proofing techniques could include document scanning by the user device 14, document scanning with live video selfie, document scanning with remote live video chat session, in-person verification at a specific location, in-person verification using on-demand runners, machine learning techniques (e.g., continuously monitor user behavior to detect anomalies and score identities accordingly), and the like. Document scanning may include feature extraction, but also utilize cryptographic features present on the document such as the ones present in e-passport.

§ 6.5 Receive Identities

Receive identities are used to contact the user and can include, without limitation, Emails, phone numbers, social logins, virtual aliases, and the like for an easy way for entities to address an individual for information sharing purposes. Users can receive information sharing requests on any of these "addressable" identities via the trust system. For example, the Relying Party 56 has the user's email and wants to verify age via the email. The User is able to granularly control which information sharing requests they want to receive on what receiving address, possibly disabling a receive address as a whole, blocking a Relying Party 56 from asking anything or blocking a particular category of relying parties from requesting information.

This control can be via the app 22 on the user device 14. For example, the user can set rules such as people with the user's email can ask for a first subset of attributes, people with the user's cell phone cam ask for a second subset of attributes, people who are the user's social network connections can ask for a third subset of attributes, etc. Again, the information shared can be the attribute itself as well as a minimum subset or derivative of the data required to answer a request so that the data is only shared with the Relying Party 54 on a limited basis. Also, there can be a "block" function which allows the user to block certain requests. Thus, the user has complete control over each addressable ID as well as end user control for the subset of attributes.

§ 6.6 Shared Signals

A shared signal model is a collaborative system, enabled through the trust system 20, that enables sharing of information between the attribute provider 58 and the ID owners 54 (users) to reduce the impact of fraud and account theft. In the process of continuously monitoring for the strength of the binding between multiple identities (i.e., the attributes in the personal data store), shared signals can be used to derive useful information.

For example, upon detecting that a mail account has been compromised, the mail provider notifies the trust system 20 via shared signals. The trust system 20 uses that information to associate a very low score to the identity association between the mail account and the primary public key identity, effectively preventing an attacker to use the email control to escalate an attack using the trust system 20.

§ 6.7 Multiple User Devices

Most users will have more than one user device 14 with the app 22 accessing the trust system 20. For example, a user can have a mobile device, a tablet, and/or a desktop/laptop. Each of the user devices 14 can be assigned a unique public/private key-pair for the personal data store. To allow another device to access the personal data store, attribute shares can be created between the user devices 14 to allow attribute access. For example, when a second user device 14 is registered, it requests access to all attributes registered by a first user device 14. The first user device 14 can approve or deny the request for security and permission. This approach requires both devices to be active and connected.

§ 6.8 Data Recovery Options

Data recovery occurs when the public key is lost, e.g., the user device 14 is lost. The recovery can be based on user responsibility, the trust system 22 responsibility, or a combination of shared responsibility. Data recovery can be implemented by encrypting the unique attribute symmetric keys with a public key corresponding to the recovery key. This allows recovery of all attributes using the recovery private key. The recovery private key can be controlled and kept safe by the ID owner (ID owner responsibility), and the following can be used to facilitate this: encode the key as a string of printable characters that can be printed or copied, encode the key as a 2D barcode, saving the key in a separate storage device (cryptographic or not), sending the key using traditional mail service or by e-mail.

§ 6.9 Personal Data Store Method

Referring to FIG. 8, in an exemplary embodiment, a flowchart illustrates a computer-implemented method 600 for managing a personal data store binding one or more identities associated with a user. The computer-implemented method 600 is implemented in a trust system 20 including one or more processing devices 12 communicatively coupled to a network 16. The computer-implemented method 600 includes receiving one or more self-asserted first attributes by the user and second attributes asserted by an Attribute Provider (step 602); utilizing one or more of the first attributes and the second attributes as inputs to obtain and/or produce one or more cryptographically signed attributes signed by an associated Attribute Provider (step 604); storing the first attributes, the second attributes, and the one or more cryptographically signed attributes in a personal data store associated with the user (step 606); and utilizing one or more of the first attributes, the second attributes, and the one or more cryptographically signed attributes to respond to a request from a Relying Party (step 608).

The storing can include encrypting each of the first attributes, the second attributes, and the one or more cryptographically signed attributes with an attribute specific symmetric key and then encrypting the symmetric key with a public key of the user and further encrypting the symmetric key with any entities provided access thereto. Each device associated with the user can be associated with a unique public key, and wherein subsequent devices are registered and associated with a different public key and provided access to the first attributes, the second attributes, and the one or more cryptographically signed attributes. The personal data store can be located in a data store communicatively coupled to the trust system and a private key associated with the public key is located in a user device. The computer-implemented method 600 can further include during the utilizing one or more of the first attributes and the second attributes as inputs, performing attribute provenance to tie the inputs to the one or more cryptographically signed attributes as outputs.

The attribute provenance can include hash pointers used to both check integrity of an associated attribute and provide a link to inputs by using associated data in creation of the hash pointers. The computer-implemented method 600 can further include utilizing the hash pointers to provide verification of an associated attribute without disclosing underlying data of the associated attribute. The first attributes can include any of name, date of birth, address, social security number, email address, phone number, driver's license number, and wherein the second attributes can include any of background checks, credit scores, verified version of the one or more self-asserted attributes, academic credentials, and professional licenses, accreditations, and memberships. The first attributes can include one or more addresses which are either physical or virtual for the user receiving information, and wherein the utilizing can include granular and general controls by the user to indicate which Relying Parties are able to make which types of requests.

In another exemplary embodiment, the trust system 20 includes a network interface communicatively coupled to a user device associated with a user, an Attribute Provider, and a Relying Party; a processor communicatively coupled to the network interface; and memory storing instructions that, when executed, cause the processor to receive one or more self-asserted first attributes by the user and second attributes asserted by an Attribute Provider; utilize one or more of the first attributes and the second attributes as inputs to obtain and/or produce one or more cryptographically signed attributes signed by an associated Attribute Provider; store the first attributes, the second attributes, and the one or more cryptographically signed attributes in a personal data store associated with the user; and utilize one or more of the first attributes, the second attributes, and the one or more cryptographically signed attributes to respond to a request from a Relying Party.

In a further exemplary embodiment, the user device 14 includes a network interface communicatively coupled to a trust system; a processor communicatively coupled to the network interface; and memory storing instructions that, when executed, cause the processor to provide one or more self-asserted first attributes by the user; access, in a personal data store associated with the trust system, the first attributes, second attributes asserted by an Attribute Provider, and one or more cryptographically signed attributes signed by an associated Attribute Provider which are obtained and/or produced by the trust system based on one or more of the first attributes and the second attributes; and permit use of one or more of the first attributes, the second attributes, and the one or more cryptographically signed attributes to respond to a request from the Relying Party.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A computer-implemented method for managing a personal data store binding one or more identities of different types associated with a user, wherein the computer-implemented method is implemented in a trust system comprising one or more processing devices communicatively coupled to a network, the computer-implemented method comprising:
   receiving one or more self-asserted first attributes by the user and second attributes asserted by an Attribute Provider;
   utilizing one or more of the first attributes and the second attributes as inputs to obtain and/or produce one or more cryptographically signed attributes signed by an associated Attribute Provider;
   storing the first attributes, the second attributes, and the one or more cryptographically signed attributes in a personal data store associated with the user, wherein the storing comprises encrypting each of the first attributes, the second attributes, and the one or more cryptographically signed attributes with an attribute specific symmetric key and then encrypting the symmetric key with a public key of the user; and
   utilizing one or more of the first attributes, the second attributes, and the one or more cryptographically signed attributes to respond to a request from a Relying Party.

2. The computer-implemented method of claim 1, wherein each device associated with the user is associated with a unique public key, and wherein subsequent devices are registered and associated with a different public key and provided access to the first attributes, the second attributes, and the one or more cryptographically signed attributes.

3. The computer-implemented method of claim 1, wherein the personal data store is located in a data store communicatively coupled to the trust system and a private key associated with the public key is located in a user device.

4. The computer-implemented method of claim 1, further comprising:
during the utilizing one or more of the first attributes and the second attributes as inputs, performing attribute provenance to tie the inputs to the one or more cryptographically signed attributes as outputs.

5. The computer-implemented method of claim 4, wherein the attribute provenance comprises hash pointers used to both check integrity of an associated attribute and provide a link to inputs by using associated data in creation of the hash pointers.

6. The computer-implemented method of claim 5, further comprising:
utilizing the hash pointers to provide verification of an associated attribute without disclosing underlying data of the associated attribute.

7. The computer-implemented method of claim 1, wherein the first attributes comprise any of name, date of birth, address, social security number, email address, phone number, driver's license number, and
wherein the second attributes comprise any of background checks, credit scores, verified version of the one or more self-asserted attributes, academic credentials, and professional licenses, accreditations, and memberships.

8. The computer-implemented method of claim 1, wherein the first attributes comprise one or more addresses which are either physical or virtual for the user receiving information, and wherein the utilizing comprises granular and general controls by the user to indicate which Relying Parties are able to make which types of requests.

9. A trust system, comprising:
a network interface communicatively coupled to a user device associated with a user;
a processor communicatively coupled to the network interface; and
memory storing instructions that, when executed, cause the processor to
receive one or more self-asserted first attributes by the user and second attributes asserted by an Attribute Provider;
utilize one or more of the first attributes and the second attributes as inputs to obtain and/or produce one or more cryptographically signed attributes signed by an associated Attribute Provider;
store the first attributes, the second attributes, and the one or more cryptographically signed attributes in a personal data store associated with the user; and
utilize one or more of the first attributes, the second attributes, and the one or more cryptographically signed attributes to respond to a request from a Relying Party,
wherein each of the first attributes, the second attributes, and the one or more cryptographically signed attributes are encrypted when stored with an attribute specific symmetric key and the attribute specific symmetric key is encrypted with a public key of the user.

10. The trust system of claim 9, wherein each device associated with the user is associated with a unique public key, and wherein subsequent devices are registered and associated with a different public key and provided access to the first attributes, the second attributes, and the one or more cryptographically signed attributes.

11. The trust system of claim 9, wherein the personal data store is located in a data store communicatively coupled to the trust system and a private key associated with the public key is located in a user device.

12. The trust system of claim 9, wherein the memory storing instructions that, when executed, further cause the processor to
during the utilize one or more of the first attributes and the second attributes as inputs, perform attribute provenance to tie the inputs to the one or more cryptographically signed attributes as outputs.

13. The trust system of claim 12, wherein the attribute provenance comprises hash pointers used to both check integrity of an associated attribute and provide a link to inputs by using associated data in creation of the hash pointers.

14. The trust system of claim 13, wherein the memory storing instructions that, when executed, further cause the processor to
utilize the hash pointers to provide verification of an associated attribute without disclosing underlying data of the associated attribute.

15. The trust system of claim 9, wherein the first attributes comprise any of name, date of birth, address, social security number, email address, phone number, driver's license number, and
wherein the second attributes comprise any of background checks, credit scores, verified version of the one or more self-asserted attributes, academic credentials, and professional licenses, accreditations, and memberships.

16. The trust system of claim 9, wherein the first attributes comprise one or more addresses which are either physical or virtual for the user receiving information, and wherein the utilizing comprises granular and general controls by the user to indicate which Relying Parties are able to make which types of requests.

17. A user device, comprising:
a network interface communicatively coupled to a trust system;
a processor communicatively coupled to the network interface; and
memory storing instructions that, when executed, cause the processor to
provide one or more self-asserted first attributes by the user;
access, in a personal data store associated with the trust system, the first attributes, second attributes asserted by an Attribute Provider, and one or more cryptographically signed attributes signed by an associated Attribute Provider which are obtained and/or produced by the trust system based on one or more of the first attributes and the second attributes; and
permit use of one or more of the first attributes, the second attributes, and the one or more cryptographically signed attributes to respond to a request from the Relying Party,
wherein each of the first attributes, the second attributes, and the one or more cryptographically signed attributes are encrypted when stored with an attribute specific symmetric key and the attribute specific symmetric key is encrypted with a public key of the user.

* * * * *